United States Patent [19]
Murray, Jr.

[11] Patent Number: 5,628,138
[45] Date of Patent: May 13, 1997

[54] WEEDLESS FISHING LURE

[76] Inventor: John H. Murray, Jr., 2709 Inverness Blvd., Rawlins, Wyo. 82301

[21] Appl. No.: 630,728

[22] Filed: Apr. 10, 1996

Related U.S. Application Data

[63] Continuation-in-part of Ser. No. 406,468, Mar. 20, 1995, abandoned.

[51] Int. Cl.$^6$ ............................................. A01K 85/02
[52] U.S. Cl. ............................................. 43/35; 43/42.41
[58] Field of Search ........................ 43/35, 41, 42.1, 43/42.41

[56] References Cited

U.S. PATENT DOCUMENTS

| | | | |
|---|---|---|---|
| 1,173,694 | 2/1916 | Witty | 43/35 |
| 1,694,697 | 12/1928 | Beidatsch | 43/42.34 |
| 2,431,434 | 11/1947 | Tallaksen | 43/35 |
| 4,562,661 | 1/1986 | Messinger et al. | 43/35 |
| 4,827,656 | 5/1989 | Ohnishi | 43/35 |
| 5,367,818 | 11/1994 | Aduana | 43/42.41 |

*Primary Examiner*—J. Elpel
*Attorney, Agent, or Firm*—Chase & Yakimo

[57] ABSTRACT

A fishing lure comprises an artificial lure having a mouth portion for securement of a fishing line thereto. The artificial lure has a slot therein communicating with an internal body cavity. A spring member having normal and flexed conditions is positioned in the cavity. A hook member is secured to the spring member within the slot and extends from the slot when the spring member is in its flexed condition.

4 Claims, 3 Drawing Sheets

WEEDLESS FISHING LURE

CROSS-REFERENCE

This application is a continuation-in-part of application Ser. No. 08/406,468, filed Mar. 20, 1995, now abandoned.

BACKGROUND OF THE INVENTION

The present invention relates to a weedless fishing lure and more particularly pertains to protecting a hook within a fishing lure until a fish strikes.

The use of weedless fishing lures is known in the prior art. More specifically, weedless fishing lures heretofore devised and utilized for the purpose of preventing the lure from snagging have various structural configurations for achieving their respective objectives and requirements.

By way of example, U.S. Pat. No. 5,146,706 to Hilliard; U.S. Pat. No. 5,107,615 to Shaffer; U.S. Pat. No. 5,007,195 to Patterson; U.S. Pat. No. 4,976,060 to Nienhuis; and U.S. Pat. No. 4,054,004 to Schott are directed to weedless fishing lures employing means to minimize exposure of the hook(s) until a fish strikes the lure. In this respect, the weedless fishing lure according to the present invention substantially departs from the conventional concepts and designs of the prior art, and in doing so provides an improved apparatus primarily developed for the purpose of effectively protecting a hook within a fishing lure until a fish strikes.

Therefore, it can be appreciated that there exists a continuing need for a new and improved weedless fishing lure which can be used for protecting a hook within a fishing lure until a fish strikes. In this regard, the present invention substantially fulfills this need.

SUMMARY OF THE INVENTION

The present invention essentially comprises an artificial lure having a top portion, a bottom portion, a head portion, a tail portion, and an intermediate portion therebetween. The head portion has a mouth portion for securement of a fishing line thereto. The bottom portion has a slot formed therein. The slot extends from the intermediate portion to the tail portion. The device contains a spring member having an upper curvilinear or arcuate component and a lower spring portion. The upper curvilinear component is disposed within the top portion and the lower spring portion is positioned beneath the upper curvilinear component within the slot in the artificial lure in the intermediate portion thereof in a normal orientation. The lower spring portion has a flexed orientation whereby the lower spring portion takes an arc shape conforming to the upper curvilinear component. The device contains a hook member having an elongated portion and an arcuate hook portion. The elongated portion is secured to the lower spring portion of the spring member within the slot in the artificial lure. The arcuate hook portion is positioned within the slot in the artificial lure in the tail portion thereof when the lower spring portion is in the normal orientation (hook retracted). The hook member extends outwardly through the slot in the artificial lure when the lower spring portion is in the flexed orientation for engaging a fish.

There has thus been outlined, rather broadly, the more important features of the invention in order that the detailed description thereof that follows may be better understood, and in order that the present contribution to the art may be better appreciated. There are, of course, additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved weedless fishing lure which has the advantage of increased reliability.

It is another object of the present invention to provide a new and improved weedless fishing lure which may be easily and efficiently manufactured and marketed.

It is a further object of the present invention to provide a new and improved weedless fishing lure which is of durable and reliable construction.

An even further object of the present invention is to provide a new and improved weedless fishing lure which is susceptible of a low cost of manufacture with regard to both materials and labor, and which accordingly is then susceptible of low prices of sale to the consuming public, thereby making such a weedless fishing lure economically available to the buying public.

Yet another object of the present invention is to provide a new and improved weedless fishing lure which provides in the apparatuses and methods of the prior art some of the advantages thereof, while simultaneously overcoming some of the disadvantages normally associated therewith.

Still another object of the present invention is to provide a new and improved weedless fishing lure for protecting a hook within a fishing lure until a fish strikes.

Lastly, it is an object of the present invention to provide a new and improved weedless fishing lure comprising an artificial lure having a mouth portion for securement of a fishing line thereto. The artificial lure has a slot formed therein communicating with an internal body cavity. A spring member is secured within the slot in the artificial lure. A hook member is secured to the spring member within the slot in the artificial lure and is normally maintained in a retracted position therein.

These together with other objects of the invention, along with the various features of novelty which characterize the invention, are pointed out with particularity in the claims annexed to and forming a port of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

3

Figure 1:
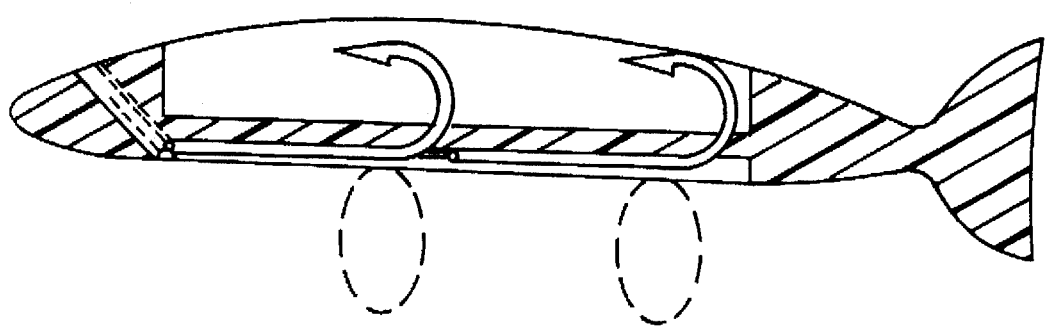

FIG. 1 is a longitudinal cross-sectional view of a prior art weedless fishing lure.

Figure 2:
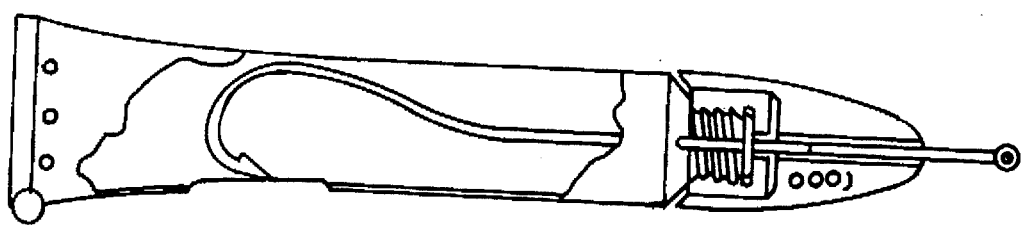

FIG. 2 is a longitudinal cross-sectional view of a prior art weedless fishing lure.

Figure 3:
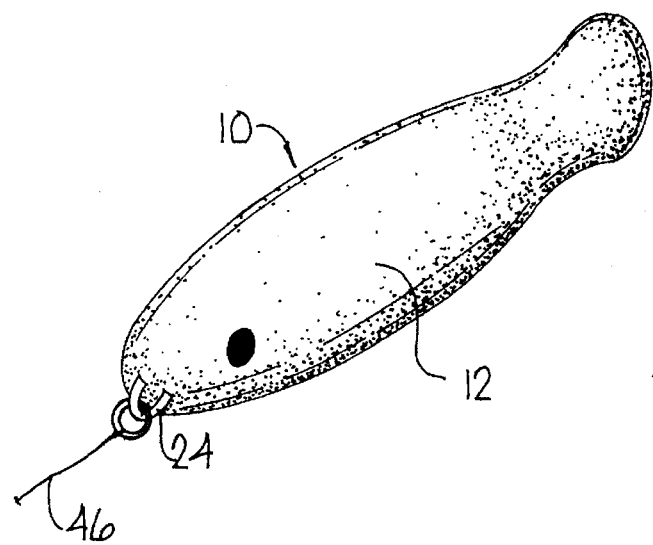

FIG. 3 is a perspective view of the preferred embodiment of the weedless fishing lure constructed in accordance with the principles of the present invention.

Figure 4:
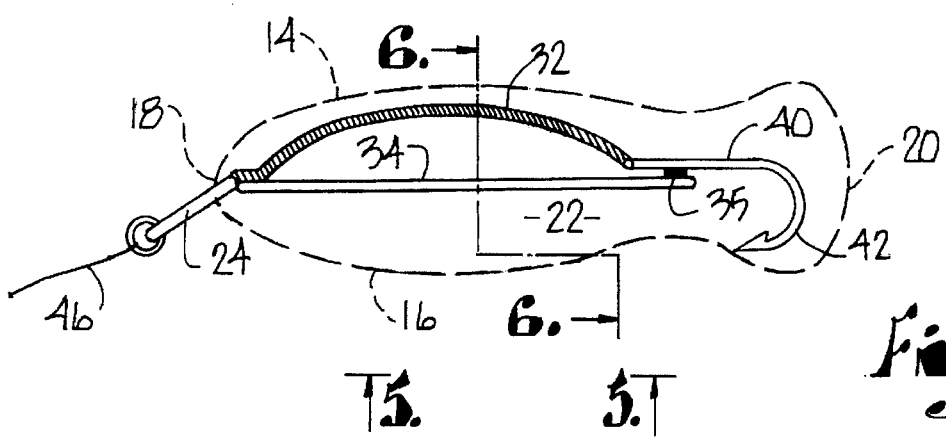

FIG. 4 is a side elevation view of the present invention, certain internal components being shown in full and broken lines.

Figure 5:
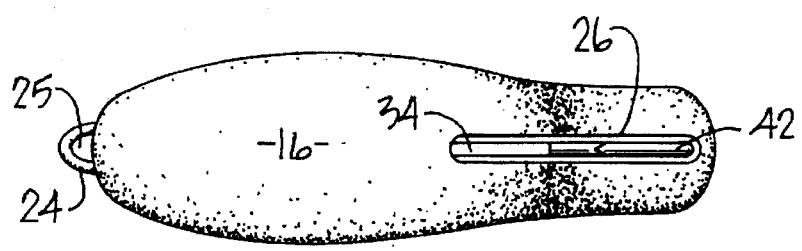

FIG. 5 is a bottom view of the present invention as taken along line 5—5 of FIG. 4.

Figure 6:
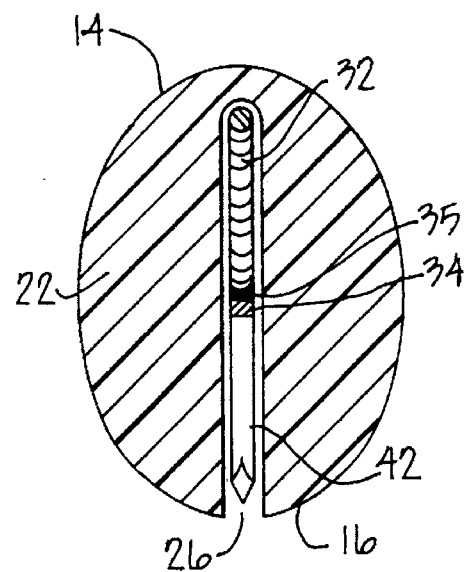

FIG. 6 is an enlarged cross-sectional view as taken along line 6—6 of FIG. 4.

Figure 7:
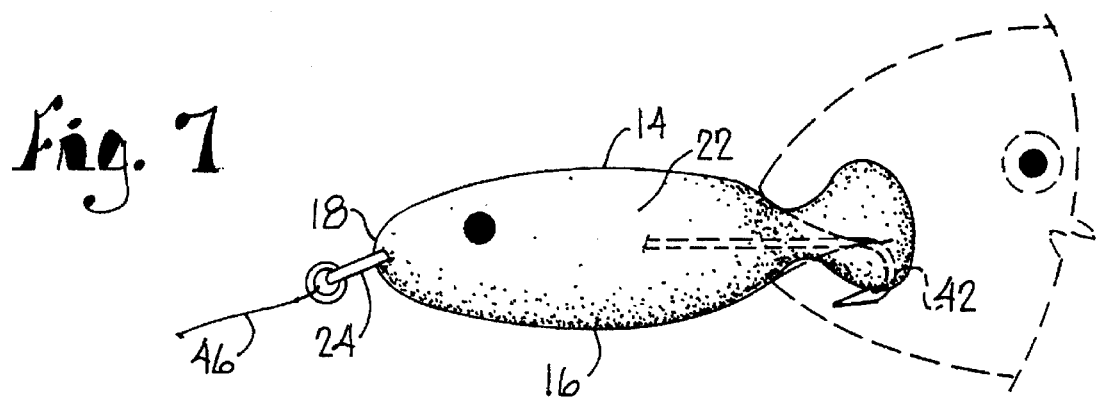

FIG. 7 is a side elevation view of the present invention being engaged by a fish.

Figure 8:
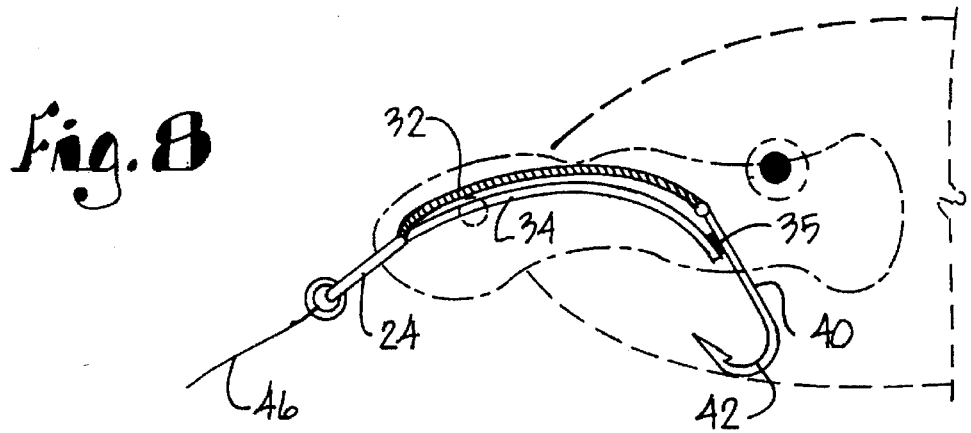

FIG. 8 is a side elevation view of the present invention being engaged by a fish.

The same reference numerals refer to the same parts through the various Figures.

DESCRIPTION OF THE PREFERRED EMBODIMENT

With reference now to the drawings, and in particular, to FIGS. 3–8 thereof, the preferred embodiment of the new and improved weedless fishing lure embodying the principles and concepts of the present invention and generally designated by the reference number 10 will be described.

Specifically, it will be noted in the various Figures that the device relates to a new and improved weedless fishing lure for protecting a hook within a fishing lure until a fish strikes. In its broadest context, the device consists of an artificial lure, a spring member, a hook member, and a fishing line.

The device 10 includes an artificial lure 12 having a hollow, elongated body presenting a top portion 14, a bottom portion 16, a head portion 18, a tail portion 20, and an intermediate portion 22 therebetween. The head portion 18 has a mouth portion 24 for securement of a fishing line 46 thereto. The mouth portion 24 extends downwardly at an acute angle from the head portion 18 and has an aperture 25 formed therethrough to allow the fishing line to be easily attached to the artificial lure 12. The bottom portion 16 has a slot 26 formed therein. The slot 26 extends from the middle of the bottom portion 26 to the tail portion 20. The slot 26 has a depth that extends from the bottom portion 16 to within the top portion 14 to provide an internal body cavity. The artificial lure 12 is fabricated of a soft rubber or plastic material and encases the internal components to be described below. The artificial lure 12 could be made in a variety of sizes and colors to replicate different types of fish and other water life.

The device 10 contains a spring member having an upper curvilinear portion 32 and a lower spring portion 34. The upper curvilinear portion 32 comprises a relatively stiff arcuate wire or plastic support component for the spring portion 34, and is positioned in the internal body cavity of the artificial lure 12 in the top and intermediate portions thereof. The lower spring portion 34 is of spring steel or resilient plastic, and is positioned beneath the upper curvilinear portion 32 within the slot 26 in the artificial lure 12 in the intermediate portion 22 thereof in a normal orientation. The lower spring portion 34 has a flexed orientation (FIG. 8) whereby the lower spring portion 34 takes an arc shape conforming to the upper curvilinear portion 32. Pressure exerted on the intermediate portion 22 of the artificial lure 12 causes the lower spring portion 34 to shift to the flexed orientation. The release of pressure will return the lower spring portion 34 to the normal orientation.

The device 10 contains a hook member having an elongated portion or shank 40 and an arcuate hook portion 42. The elongated portion 40 is secured at its forward end to the upper curvilinear portion 32 of the spring member within the slot 26 in the artificial lure 12. The arcuate hook portion 42 is positioned within the slot 26 in the artificial lure 12 in the tail portion 20 thereof when the lower spring portion 34 is in the normal orientation. The arcuate portion 42 extends outwardly of the slot 26 in the artificial lure 12 when the lower spring portion 34 is in the flexed orientation for engagement of a fish (FIG. 8). While a user is fishing, especially in heavily weeded areas, the device 10 is more useful in that the arcuate portion 42 of the hook member is positioned within the artificial lure 12 until the lower spring portion 34 of the spring member is in the flexed orientation thereby preventing the arcuate portion 42 from becoming snagged within the weeded area. The arcuate portion 42 is also positioned to engage a fish if it bites at only the tail portion 20 of the artificial lure 12, as illustrated in FIG. 7.

The fishing line 46 is secured to the mouth portion 24 of the head portion 18 of the artificial lure 12 within the aperture 25 and extends to a user's fishing pole. In the fishing lure 12 the hook member 40, 42 is protected in the body until a fish strikes, causing the hook to spring out and engage the fish as illustrated in FIG. 8.

This system of the present invention consists of soft bodied lure 12 and the spring member 32, 34 and hook member 40, 42. The lure 12 can be made in any of the popular shapes, sizes and colors that have been proven effective. The spring member and hook member work in conjunction with the lure 12, the lower spring portion 34 being of a flat bar type and extending the length of the cavity in the body of the lure 12. As viewed in FIG. 4, the left ends of curvilinear portion 32 and spring portion 34 are joined and are attached to the mouth portion 24. The right (rear) end of spring portion 34 is attached to the elongated shank 40 of the hook member at 35, a point intermediate the left end of shank 40 and arcuate portion 42. The spring portion 34 is essentially straight and flat in the normal condition. The left end of shank 40 is joined to the adjacent end of curvilinear portion 32. The hook member is thus retracted in the narrow slot 26 in the underside of the lure 12, with no part exposed.

With the hook member retracted, the lure 12 can be used to fish in heavy weeds, brush, and around sunken obstacles without the fear of becoming snagged. The lure 12 simply slides over or around anything it encounters. However, when a fish strikes the lure 12, the pressure causes the spring portion 34 to flex from the flat condition to an arc shape (FIG. 8) which quickly lowers the hook member to engage in the fish's mouth. If the fish strikes short as shown in FIG. 7, the soft body of the lure 12 permits the hook member 40, 42 to function normally.

Having thus described the invention, what is claimed as new and desired to be secured by Letters Patent is as follows:

1. A weedless fishing lure for protecting a hook within a fishing lure until a fish strikes comprising, in combination:

an artificial lure having a top portion, a bottom portion, a head portion, a tail portion, and an intermediate portion therebetween, the head portion having a mouth portion for securement of a fishing line thereto, the bottom portion having a slot therein extending to the tail portion;

a spring member having an upper curvilinear portion and a lower spring portion, the upper curvilinear portion being within the top portion of the artificial lure, the lower spring portion positioned beneath the upper curvilinear portion within the slot in the artificial lure in the intermediate portion thereof in a normal orientation, the lower spring portion having a flexed orientation whereby the lower spring portion has an arc shape generally conforming to the upper curvilinear portion; and a hook member secured to the lower spring portion of the spring member within the slot in the artificial lure, the hook member being positioned within the slot in the artificial lure in the tail portion thereof when the lower spring portion is in the normal orientation, the hook member extending outwardly of the slot in the artificial lure when the lower spring portion is in the flexed orientation for engagement of a fish.

2. A weedless fishing lure for protecting a hook within a fishing lure until a fish strikes comprising, in combination:

an artificial lure having a top portion, a bottom portion, a head and a tail, the head having means for securement of a fishing line thereto, one of said portions having a slot therein extending to the tail;

a spring member having an arcuate support component and a spring portion, the arcuate component being within the other of said portions of the artificial lure, the spring portion positioned within the slot in the artificial lure in a normal orientation, the spring portion having a flexed orientation whereby the spring portion has an arc shape generally conforming to the arcuate component; and a hook member secured to the spring member within the slot in the artificial lure.

3. The lure as claimed in claim 2, wherein the hook member has a shank secured to the spring portion of the spring member within the slot in the artificial lure, the hook member being positioned within the slot in the artificial lure in the tail thereof when the spring portion is in the normal orientation, the hook member extending outwardly of the slot in the artificial lure when the spring portion is in the flexed orientation for engagement of a fish.

4. The lure as claimed in claim 2, wherein a fishing line is adapted to be secured to the securement means on the head of the artificial lure.

* * * * *